United States Patent Office 3,258,339

Patented June 28, 1966

3,258,339

LITHOGRAPHIC PLATE AND METHOD OF PREPARING SAME

Dolor N. Adams, Cleveland Heights, Ohio, and Elmer F. Deal, West Covina, Calif., assignors, by mesne assignments, to Harris-Intertype Corporation, Cleveland, Ohio, a corporation of Delaware No Drawing. Filed May 28, 1964, Ser. No. 371,131

34 Claims. (Cl. 96—86)

The present invention relates to improved intermediate coatings in lithographic plate structures that are arranged between the plate bases and the light sensitive materials.

This application is a continuation-in-part of our co-pending applications Serial Nos. 160,319 and 160,320, both filed December 18, 1961 and both now abandoned.

In lithography, the printing surface lies substantially in the same plane as a supporting base in distinction to the letterpress method in which the matter to be printed is raised from a supporting base and in further distinction to the gravure or intaglio process in which the printing surface is actually cut into the supporting base. To obtain a printing action from a substantially plane surface, certain areas of the surface are made oleophilic while the remaining areas are made hydrophilic. In particular, a greasy image is outlined on the surface and followed successively by water and ink applications over the surface as by rollers. The hydrophilic areas thus acquire a film of water while subsequently rejecting the ink. In contrast, the greasy or oleophilic areas reject the water but acquire a film of ink. The ink configuration can then be readily transferred by pressing the plane lithographic surface against a copying surface.

To obtain on a plate the oppositely functioning hydrophilic and oleophilic areas in accordance with a desired image, the plate is covered with a relatively thin coat or film of a light sensitive agent. Many of these agents are known in the art, such is bichromated albumin and diazo resins, which may be applied to the plate in an aqueous medium (colloidal dispersion) and then dried. An aqueout medium is much preferred in applying a light sensitive agent to a plate, since such a medium is most inexpensive, easy to handle, and can be quickly disposed of simply by drying the plate without the need for any health safeguards as would be the case if organic media were used.

In any event, after the sensitized layer is applied, the lithographic plate is then exposed to light through a transparency, stencil, negative or the like having a desired image. Those portions of the layer so exposed react to provide a water insoluble oleophilic material. In this manner, the layer is differentially hardened. By washing the exposed light sensitive layer with a developer or wash-wash solution in a manner known in the art, the non-hardened or unreacted portions of the layer are washed away to lay bare the underlying base member which is usually metal. These bared metal areas form the hydrophilic areas of the resulting lithographic plate, while the light-hardened or reacted portions are unaffected by the water-wash and remain on the metal surface to form the oleophilic printing areas.

A lithographic plate prepared in the manner indicated must produce many thousands of impressions in order to be commercially acceptable. In prior plates, the hydrophilic areas provided by the bare metal of the plate tend in time to lose their water attractiveness. When this loss of water attractiveness occurs, the plate begins to pick up ink at these areas intended to be hydrophilic, so that "scumming" of the plate results. In the same manner, the definition of the image on the plate and on copies printed therefrom suffers, and the plate must be discarded.

In an effort to minimize scumming and lengthen the useful life of the plate, coating materials which overlie the lithographic plate have been proposed. Coating materials that have been proposed are modified urea-aldehyde resins and modified melamine-aldehyde resins. However, a problem has arisen in suitably processing such resins when it is desired to produce a lithographic plate for an especially long and clean run on a printing press. Apparently, if the modified resin is not completely hardened, continuous exposure and rinsing with water as from a fountain solution tends to dissolve or leach out some of the urea-aldehyde or melamine-aldehyde coating, so that extensive long runs on a press are not readily obtained. On the other hand, if the modified resin is sufficiently hard to resist this leaching action, the resin is not as receptive to a light sensitive agent so that again an especially long running plate is not easily obtained.

We have now discovered that the advantages of a coating of a urea-aldehyde or melamine-aldehyde resin can be retained while avoiding the difficulties of suitably processing or hardening these resins for long press runs. To accomplish this, we treat the urea-aldehyde and melamine-aldehyde coats with a water-soluble acrylic acid derivative which is monomeric. This treatment provides a copolymerization between the urea-aldehyde or melamine-aldehyde and the acrylic acid derivative and results in the insolubilization of the acrylic compound coat and its permanent bonding to the treated surface. This reaction gives a unique surface. Previously, various metals have been treated with homopolymerized derivatives of acrylic acids. In these cases, the reaction was between the metallic surface and the carboxylic acid groups of the polyacids. A certain degree of water-receptivity was imparted to the surface by the presence at intervals along the polymer chain of unreacted carboxylic acid groups. In the present invention, the reaction of the urea-aldehyde resin or melamine-aldehyde resin is with the ethylenic linkage of the organic and essentially water-repellent portion of the acrylic molecule. Therefore, there are present on the surface all of the original carboxylic acid groups, one for each molecule of acrylic acid or derivative which has reacted. This results, as we have found experimentally, in two desirable end results. First, the top surface of the plate is more hydrophilic, since more free carboxylic acid groups are oriented there. Second, the interlayer formed by the copolymerization is much less hydrophilic and comparatively hydrophobic and is, therefore, a more efficient barrier between the sensitizer and the metal surface.

Still further, the use of a sensitizer compound with a coating consisting of only a polyacrylate does not always provide prolonged shelf life, since the sensitizer tends to penetrate such a coating in time and attack the metal plate.

Thus, the present plate is much less susceptible to the tendencies of scumming and loss of image definition and is, moreover, particularly well suited to receive a light sensitive agent. The present coating materials are hydrophilic and water dispersible, so that they are easily applied to a base from a water medium. The first or modified urea-aldehyde or modified melamine-aldehyde coat of the coating can be deposited in varying thicknesses. The present coating of dual heteropolymerized coats adheres well to a base member and is not stripped therefrom during handling or shipping and meets as well the indicated qualifications for a light sensitive agent.

It is, therefore, an object of the present invention to provide an improved plate for lithographic printing and related uses and to provide a process for making it.

A further object is to provide a metallic lithographic plate having an improved intermediate coating of dual coats comprising a first coat of a modified urea-aldehyde resin or modified melamine-aldehyde resin, and a second coat formed in situ by reaction of the modified resin and a monomeric acrylic acid or derivative.

Other objects will be apparent herein.

To the accomplishment of the foregoing and related ends, the invention consists of the features hereinafter fully described and particularly pointed out in the claims, the following disclosure describing in detail the invention, such disclosure illustrating, however, but one or more of the various ways in which the invention may be practiced.

In accordance with the present invention, a plate for lithographic printing and related uses may be prepared by applying dual heteropolymerized coats over a base member to provide a water-insoluble coating having a hydrophilic character, and then applying an overcoat or film of a light sensitive agent on the coating. The first coat overlying the base member comprises a modified urea-aldehyde or melamine-aldehyde resin, and the second coat overlying the first coat comprises the polymerization product formed by reaction of the modified resin with a monomeric acrylic acid or derivative.

For purposes of the invention, the modified resin may be an alkylated methylol melamine, or a polyalkylenepolyamine-melamine-aldehyde, or a polyfunctional amino-urea-aldehyde or a sulfonated urea-aldehyde, or a compatible mixture of these. The aldehyde preferred and usually employed is formaldehyde, although paraformaldehyde may be used.

The alkylated methylol melamines are water dispersible and can therefore be applied to a plate from a preferred aqueous medium.

The term "aqueous dispersion" is used herein and in the claims in a broad sense and is taken to include as well resins which are water-soluble or water-dilutable.

The preparation of an alkylated methylol melamine resin is fully disclosed in U.S. Patent No. 2,715,619 and accordingly is not here disclosed in detail.

In general, melamine and formaldehyde are reacted in a mixture of water and an aliphatic alcohol at a temperature between 50° C. and reflux temperatures and at a pH between 7 and 12. Thereafter, an additional amount of aliphatic alcohol is added to bring the mol ratio of the total alcohol charged to the total water charged to at least about 2:1. The mixture is then further reacted so as to effect substantially complete alkylation under acid conditions and the resulting syrup then neutralized.

The first step of the preparation, that is, the reaction of melamine with formaldehyde in an alcohol-water mixture, is considered to be the most critical, particularly the relative proportions of the formaldehyde, alcohol and water. In this first step, the mol ratio of alcohol to water to be introduced into the sphere of reaction should be between about 5:1 to about 0.5:1 and preferably between about 2:1 and 1:1. After this first step has been completed, additional alcohol is added sufficient to bring the mol ratio of the total amount of alcohol charged to the total amount of water charged to at least about 2:1 to 10:1, and preferably to about 3:1 to 10:1. The mol ratio of alcohol to formaldehyde should be within the range of 0.4:1 to 5:1 and preferably within the range of 0.5:1 to 1:1 in the described first step.

The alcohol may be added initially in full amount, or part of the alcohol may be added initially and the remainder may be added after the methylol melamine has formed. In view of the fact that in the reaction of the first step, the proportion of formaldehyde, alcohol and water is very critical, the latter course is greatly preferred. The total amount of alcohol employed, of course, depends on the degree of methylation desired.

The amount of melamine employed in the reaction should be such that the molar ratio of melamine to formaldehyde is within the range of 1:1.5 to 1:6, respectively, although the preferred range is from 1:2.5 to 1:4, respectively.

The etherifying alcohol used is not critical as long as the resin prepared in accordance with the procedure outlined in Patent No. 2,715,619 is water-dispersible, water-soluble and the like. Accordingly, the simpler alcohols are preferably used such as methyl alcohol and ethyl alcohol. Aliphatic alcohols of more than two carbon atoms result in products of limited water-solubility or water-dispersibility.

The polyalkylenepolyamine-melamine-aldehyde resins are also water-dispersible and can therefore be applied to a plate from a preferred aqueous medium. The preparation of a water-dispersible resin of this type is fully disclosed in U.S. Patent No. 2,796,362 and therefore is not here disclosed in detail.

According to one method for preparing the resins, melamine and formaldehyde are mixed and heated at about 75° C. under alkaline conditions for about half an hour or until at least about five mols of the formaldehyde have reacted, whichever is longer. The polyalkylenepolyamine is then added and the reaction continued at a pH of about 2 to 7. The resin shows acceptable activity as a bonding agent very shortly thereafter.

The resins are characterized by a content of at least five and preferably more than six mols of formaldehyde per mol of melamine. The syrups are distinctly more stable when containing eight mols of formaldehyde per mol of combined melamine. There appears to be no maximum limit to the amount of formaldehyde which the syrup or resulting product may advantageously contain, but only negligible improvement in stability occurs when more than thirty mols are used. Preferably then, the syrup contains between about 8 and 30 mols of formaldehyde per mol of melamine.

If desired, the polymerization may be carried until the resin is on the verge of gelation. In practice it has been found advantageous to terminate the reaction when the viscosity of the syrup at 35% solids and 25° C. is at least 50 centipoises and preferably between about 200 and 500 centipoises so as to obtain a stable water-soluble or water-dilutable product of large molecular size while avoiding the danger of gelation.

Alternatively, the melamine and all the formaldehyde and polyalkylenepolyamine may be mixed together and the mixture heated to about 70° C. for a few minutes, after which the mixture is heated at an acid pH until the desired viscosity is obtained. Alternatively still, the melamine and formaldehyde may be reacted at an alkaline pH until a low polymer has formed, after which the polyalkylenepolyamine is added and the reaction continued at an acid pH. In each instance, no more than about five mols of formaldehyde need be present during the initial alkaline reaction, and the remainder of the formaldehyde may be added when the mixture is brought to the acid side.

The amount of polyalkylenepolyamine should be sufficient to supply between about 0.3 and 10 nitrogen atoms per molecule of melamine. Less than this results in the development of a resin of inferior characteristics, either because of insufficient stability, poor water-dispersibility or inferior anchoring results. The use of a large amount of polyalkylenepolyamine does not increase the effectiveness of the resin as an anchoring agent and results in development of a resin which cures at a considerably slower rate. As a practical matter, it is preferred to employ polyalkylenepolyamine in an amount sufficient to supply between about 0.5 and 4 nitrogen atoms per molecule of melamine, as in this range a satisfactory stable resin is usually obtained which gives very good anchoring and which cures rapidly.

Any of the simple water-soluble polyalkylenepolyamines and/or their salts may be used. These include such polyamines as diethylenetriamine, triethylene tetramine, tetraethylenepentamine and the corresponding polypropylene-polyamines, as well as 4,4′-iminobisbutylamine and 3,3′,3″-nitrilotrispropylamine. The compound 3,3′-iminobispropylamine has been found to be very effective. In general, any water-soluble aldehyde-reactive polyalkylenepolyamine may be used as long as the ratio of carbon atoms to nitrogen atoms therein is not greater than about 4:1.

The higher polyalkylenepolyamines may likewise be used so long as they are water-soluble. Among these are specifically included polyethylenimine (formed by homopolymerization of ethylenimine) and the long chain polyalkylenepolyamines formed by reacting a simple alkylenediamine or a simple polyalkylenepolyamine with about 0.6 to 1.5 mols of an alkylene dichloride, an alkylene dichlorohydrin or epichlorohydrin. Thus, ethylenediamine or trimethylenediamine may be reacted with 1,2-dichloroethane, 1,3-dichloropropane, 1,2-dichloropropane and the like; note U.S. Patent No. 2,616,874. The polyalkylenepolyamines thus formed may have a molecular size so high that 33% aqueous solutions thereof have a Gardner-Holdt viscosity at 25° C. of N. In addition, there may be used the intermediate size polyalkylenepolyamines formed by reaction of simple polyalkylenepolyamines with small amounts of suitable dihalides.

Although the teaching of Patent No. 2,796,362 are to the effect that polyalkylenepolyamine melamine-formaldehyde resins prepared as described are converted to a hydrophobic form upon drying a base material which has been contacted by such resins, it has been unexpectedly found that when such resins are further polymerized onto a support or base as hereinafter described, they not only lose their water-dispersibility but the resins themselves become sufficiently hydrophilic and water-attractive that they react well and form polymerization products with water-soluble acrylic acids or derivatives. Apparently, the resins are hydrophobic in that water does not penetrate them, but films of such resins will receive and react with water solutions of acrylic acids and derivatives. Therefore, the coating has a dual nature, being very water-receptive at its top surface and less hydrophilic or relatively hydrophobic at the side nearer the support member.

The polyfunctional amino-urea-formaldehydes are infinitely water dilutable and can therefore be applied to a plate from a preferred aqueous dispersion.

The preparation of a polyfunctional urea-aldehyde resin is fully disclosed in U.S. Patent No. 2,554,475 and accordingly is not here disclosed in detail. In general, urea and an aqueous solution of formaldehyde are reacted at a temperature of about 70° C. to 80° C. for 15 to 30 minutes under alkaline conditions. A polyfunctional amine is then added, after which the pH is adjusted to between 1 and 4 and the reactants heated at a temperature of from 68° C. to reflux temperature for 15 to 180 minutes so that there is no viscosity increase. The temperature is then reduced to a point within the range of room temperature to 55° C. to effect a viscosity increase.

The mol ratio of formaldehyde to urea does not appear to be critical in preparing a polyfunctional amino-urea-formaldehyde. Satisfactory results have been obtained with a mol ratio of from about 2.0 to about 3.0 mols of formaldehyde per mol of urea. For best results, the ratio of aldehyde to urea is preferably 2.3 to 2.8.

The quantity of polyfunctional amine employed does not appear to be critical, although a minimum amount must be employed to obtain solubility and other desirable properties. Satisfactory products may be obtained by reacting the amine at any stage of the reaction; it being preferred, however, to add the amine after the initial reaction of urea and aldehyde. It is usually the procedure in making these resins to use 2 to 80 percent polyfunctional amine based on the weight of urea, and for most utilities, it is preferable to use about 6 to 15 percent.

As examples of polyfunctional amines which have been found to be satisfactory, there may be mentioned the polyamines; such as ethylenediamine, diethylenetriamine, triethylenetetramine, tetraethylenepentamine; the condensation products of polyamines leading to amine polymers such as tetraethylenepentamine and epichlorohydrin or tetraethylenepentamine and formaldehyde; the guanidines, the biguanides, the guanylureas and the salts thereof; and the hydroxylamines such as monoethanolamine, diethanolamine and the like. Any of the above amines may be first reacted with part of the total formaldehyde before adding to the reaction.

The sulfonated urea-aldehydes are also water-dispersible and can therefore be applied to a plate from a preferred aqueous medium. The preparation of a water-soluble sulfonated urea-formaldehyde is fully disclosed in U.S. Patent No. 2,559,578 and therefore is not here discussed in detail. In general, urea, an aqueous solution of formaldehyde, and an alkali metal salt of sulfurous acid are reacted at reflux temperature for at least 30 minutes and at a pH varying between 8 and 9.4. The pH is then adjusted to a point within the range of 1 to 4, and the reaction mixture is heated again at reflux temperatures for approximately one hour. Thereafter, the mixture is cooled to a temperature between 25° C. and 85° C. while maintaining a pH of 1 to 4, thereby effecting an increase in viscosity.

Molar ratios of formaldehyde to urea do not appear to be critical. Satisfactory resins have been obtained with 1.5 to 3 mols of formaldehyde per mol of urea. It is preferred to employ urea-formaldehyde in the portions of approximately 2.0 to 2.8 mols of formaldehyde per mol of urea. The amount of the alkali metal salt of sulfurous acid used likewise does not appear to be critical. However, a minimum amount of about 5% based on the weight of the urea must be used to make the resulting resin water-dispersible and as much as 60% of the alkali metal salt by weight of the urea has been employed. Such alkali metal salts as sodium bisulfate and sodium metalbisulfite may be used.

It has been found that acrylic compounds which are water-soluble prior to reaction with the modified resin may be used in accordance with the present invention. Among such acrylic compounds are acrylic acid, methacrylic acid, the water-soluble salts of such acids such as the ammonium, sodium and potassium salts, acrylamide and methyl acrylamide. Alcohols such as methyl and ethyl alcohols may also be used as the solvents for such acrylic compounds.

The type of base member is not critical to the invention. Ordinarily, a metallic support or plate is preferred because of its inherent strength. Metals such as aluminum, zinc, copper, tin, lead, chromium, magnesium, steel and the like may be used. Aluminum has been found to give very satisfactory results and is preferred. In the case of metallic surfaces, oxides may be present, either through exposure to air or through special treatment. For example, in the case of aluminum, the surface may if desired be chemically oxidized as by chromic acid, or oxidized by being electrolytically anodized.

Other materials may constitute the base member. For example, a paper sheet or plate suitably backed, or the paper sheet impregnated with a resin such as a thermosetting resin like phenol-formaldehyde, can be employed. A heat-resistant resin is preferably employed, since it protects the paper during the heating steps which may be used in preparing a lithographic plate in accordance with the method herein disclosed. As used herein and in the claims, the term "plate" includes a plate, sheet, film, foil, and the like, foil being merely wrapped over a supporting surface.

The light sensitive agent may be any of those previously known to the art, the coating material of the present invention serving to discourage the formation of scumming in the hydrophilic areas and loss of image definition and not being critically related to the particular light sensitive agent used. For example, bichromated albumin, casein, gum arabic, gelatin, glue and the like may be employed. In all of such cases, as is understood in the art, hexavalent chromium ions chemically react with the companion material, such as casein, under the action of light to provide the water-insoluble, oleophilic material. This action of the chromium ion is thus well known in the art and may be provided by adding ammonium chromate or dichromate, sodium chromate or dichromate, potassium chromate or dichromate and the like. In addition to these, certain organic chromates and dichromates may also be used. For example, the reaction product of a quaternary ammonium hydroxide and chromic acid, or ethylenediamine and chromic acid or a soluble dichromate may be employed. Such organic materials may be advantageous in that they show less tendency to crystallize and therefore produce a more uniform sensitized coating. In general then, as is well understood in the art, the foregoing light sensitive agents comprise a tanning component disposed in a tannable colloid.

As indicated, the coating is also adapted to receive a diazo compound as the light sensitive agent. The light sensitive diazo compounds used may be those known in the art. A method of preparing a very satisfactory diazo is described in Patent No. 2,679,498 and in Patent No. 2,100,063. This compound is a condensation product of paraformaldehyde with a p-diazodiphenylamine sulfate. Diazo compounds are also described in U.S. Patents No. 2,667,415 and 2,772,972, which together with the last two mentioned patents and the diazos disclosed thereby are hereby incorporated by reference. Upon exposure to light, such as ultra-violet light, the light sensitive diazo compounds expel nitrogen from the molecule and form a water-insoluble, hydrophobic and oleophilic material which then becomes the printing image. The unexposed portions of the compound are readily washed away by known developer solutions.

As used herein and in the claims the term "light sensitive agent" is taken to mean either a light sensitive diazo compound of the type just described or a light sensitive agent consisting of both a chromium component and the material used in combination therewith such as gum arabic or any of the previously noted materials.

In preparing a plate according to the present invention, a coat of a water dispersion of the modified urea-aldehyde or melamine-aldehyde resin is applied to a support or base in any convenient manner, such as by roller coating, blade coating, dipping or spraying. The concentration of the resin in the dispersion is not critical. Ordinarily, a sufficient amount of the resin is dispersed in the water to deposit a coat of desired area and thickness. However, repeated applications and dryings may also be used to obtain a coat of desired size, particularly if the resin is of limited water-dispersibility. As an example, the modified resin may range from about 0.3% to about 5% of the dispersion. After application of the dispersion, the water is removed to deposit a coat of the resin and to insolubilize it on the base member. Conveniently, this may be done by heating the assembly. Any temperature above an ambient temperature may be used, the upper temperature limit being determined by practical considerations, such as avoiding a temperature sufficiently high to anneal the metal of the plate.

During the heating step and removal of the water, there is further polymerization of the resin, and this aids the insolubilization and adherence of the resin to the base member. However, the stage or amount of polymeric growth is not in any sense critical to practicing the invention, except that the resin should adhere well and resist a water wash so as not to bare the base member. The modified melamine-aldehyde resins prepared as described in U.S. Patent Nos. 2,715,619 and 2,796,362 and the modified urea-aldehyde resins prepared as described in U.S. Patent Nos. 2,554,475 and 2,559,578 are dispersed in water and applied as previously mentioned. Such resins are partially polymerized or cured at this time. The heating is then conducted at such a temperature within the limits described and for such a time as to drive off substantially all of the water and further polymerize the resin, such that a coat of the resin is deposited having the desired adherence and resistance to a water wash. In the case of a polyalkylenepolyamine-melamine-formaldehyde resin, the resin is dried beyond its gel point.

Whether the temperature employed is sufficiently high and/or the time of heating is sufficiently long can be easily determined by observing if the deposited coat of resin has the described desired characteristics. In practice, heating the assembly from about 140° C. to about 210° C. for approximately 3 to 12 minutes has been found to provide good results, although these ranges are not critical.

Following the deposition of the modified resin coat, the acrylic compound coat is applied from an aqueous solution, and then the assembly is heated to drive off the water and insolubilize the acrylic compound as a polymerized coat. It will thus be noted that the acrylic compound coat is not an after-treatment, that is, it is not used after light exposure but forms part of the coating and is coextensive with the coat of modified resin with which it polymerizes and, further, underlies the layer of the light sensitive agent. A coating of the two interpolymerized coats thus results.

As previously indicated, after the interpolymerization the acrylic acid radical or acrylate group is believed to be pointed or oriented away from the plate to provide the desired hydrophilic or water attractive character of the plate. At the same time, the balance of the interpolymer formed is believed to be oriented toward the plate and displays much less hydrophilic and comparatively hydrophobic properties. This balance of the interpolymer coating consists of the first deposited coat of modified resin as further modified by interreaction with the coat of acrylic compound. Alternatively, where the entire thickness of the modified resin coat is not interreacted with the acrylic compound, there results an interlayer formed of the interpolymer and having an outwardly oriented water attractive acrylic portion and an inwardly directed less hydrophilic and relatively hydrophobic portion. The latter portion of the interpolymer, in either case, thus serves as an effective barrier between the metal surface of the plate and the light sensitive agent which overlies the heteropolymerized coating and may penetrate to some extent the acrylic portion of the interpolymer.

The application of the acrylic compound can be any of those techniques previously mentioned. In the same manner, the concentration of the acrylic compound in the aqueous solution and the temperature of heating are not critical. Ordinarily, the aqueous solution contains from about 0.3% to about 6% by weight of the acrylic compound. The temperature employed for heating the assembly after application of the acrylic compound should be sufficiently high to drive off the water of the aqueous solution and copolymerize the acrylic compound with the modified resin as the acrylic compound overlies the latter. Ordinarily, sufficient polymerization is obtained by heating the assembly following the application of the acrylic compound under infra-red lamps until dry; or by heating from about 100° F. to 150° F. until dry.

Following the deposition and copolymerization of the acrylic compound, the light sensitive agent may be applied in a conventional manner as by roller coating, dipping, spraying and the like. A sufficient amount should be used to cover the entire coating and, more particularly, the topmost layer thereof which is composed of the polymerized acrylic compound coat. The light sensitive agent forms an image when exposed to light in accordance with techniques of lithographic operation. Diazo compounds are also applied from an aqueous solution. The thickness of the diazo film is not critical, a residue of about 0.003 gram per square foot of plate being an accepted practice. Aqueous solutions of up to about 2% diazo compound have also been employed.

If desired, the manufacturer of a lithographic plate of the present invention can stop short of the application of the light sensitive agent, so that a plate having only the coaing layer can be shipped to a consumer. The consumer can then apply the light sensitive agent at his own discretion. This can be practiced, for example, where light sensitive agents are used which cannot be stored for extended periods of time but need be used shortly after their application to form a plate. This procedure need not necessarily be followed where a diazo light sensitive agent is employed.

In order to demonstrate the invention, the following examples are set forth for the purpose of illustration only. Any specific enumeration or detail mentioned should not be interpreted as a limitation of the invention unless specified as such in one or more of the appended claims and then only in such claim or claims.

*Example 1*

A 1% aqueous dispersion of an alkylated methylol melamine is applied over a support member. While the member is still wet, it is wiped with a squeegee and then dried at 120° F. The assembly is then heated at 150° C. for 6 minutes. A second coat of monomeric acrylic acid is applied from a 4% aqueous solution, and the assembly heated at 100° F. until dry. A bichromated colloidal dispersion of albumin is then applied over the second coat by roller coating, and the plate is then allowed to dry.

*Example 2*

An aluminum plate is grained by treatment with a 10% aqueous solution of trisodium phosphate and then washed and desmutted. The plate is then rinsed and treated with a 2% chromic acid solution for 4.5 minutes at 150° F. to form an oxide layer on the surface. The plate is next dipped into a 0.8% aqueous dispersion of a polyalkylenepolyamine-melamine-formaldehyde resin, which may also contain about 3% of triethylene glycol as a humectant, and then heated at 170° C. for 6 minutes. A 5% aqueous solution of methacrylic acid is roller-coated over the resin coat, and the assembly heated under an infra-red lamp until dry. An aqueous solution of bichromated casein is blade-coated over the resulting coating and then air dried.

*Example 3*

A zinc plate is treated with a 1.5% aqueous dispersion of methylated methylol melamine resin formed by reacting melamine-formaldehyde and methyl alcohol in accordance with Patent No. 2,715,619. Mol ratios used are: melamine to formaldehyde 1:2, alcohol to formaldehyde 1:1, alcohol to water, initially 3:1, and after the melamine-formaldehyde reaction, additional alcohol to maintain this ratio. The plate is heated at 120° F. until dry and then further heated at 160° C. for 8 minutes. The methylated methylol melamine resin deposits as a coat over the plate and is strongly adhered thereto. A 6% aqueous solution of sodium acrylate is next blade-coated over the resin coat, and the assembly heated under infra-red lamps at about 120° F. until dry. A bichromated gelatin colloidal dispersion is applied over the resulting hydrophilic coating in an amount to cover it and form a film of suitable thickness for lithographic reproduction techniques.

*Example 4*

A copper plate is coated with a 1.2% aqueous dispersion of a polyalkylenepolyamine-melamine-formaldehyde formed by reacting formaldehyde with melamine in a molar ratio of 8:1 in the presence of a sufficient amount of iminobispropylamine to supply about 3 nitrogen atoms per molecule of melamine. The resin is prepared in accordance with Patent No. 2,796,362 and therefore is initially water-dispersible. The plate is heated at 120° F. until dry and then further heated at 200° C. for 5 minutes. The modified melamine-formaldehyde resin deposits as a coat over the plate and becomes strongly bonded thereto. A second coat of acrylamide is applied from a 6% aqueous solution by dipping the plate in such solution, after which the plate is heated at 140° F. until dry. A bichromated gum arabic colloidal dispersion is finally applied as an overcoat to the resulting coating, and the plate is then dried. Drying may be hastened by forcing air over the plate as by a fan.

*Example 5*

A procedure is carried out like the procedure of Example 4 except that an aluminum plate is used which has been electrolytically anodized. After application of the dispersion containing the light sensitive agent, the dispersion is reduced to a thin film by whirling the plate until dry. The plate thus prepared is ready for exposure to light.

*Example 6*

A procedure is carried out like the procedure of Example 3 except that the resin used is that prepared by Example 2 of Patent No. 2,715,619, and the light sensitive agent is a diazo compound, Fairmount Diazo Resin No. 4, manufactured by the Fairmount Chemical Company, and applied from a 1% aqueous solution. This diazo resin is a condensation product of paraformaldehyde with a p-diazo-diphenylamine sulfate. After the daizo application, the entire assembly is finally heated at 130° F. until dry.

*Example 7*

A procedure is carried out like the procedure of Example 4 except that the resin used in that designated Resin E in Patent No. 2,796,362, and more resin is employed to deposit a thicker coat thereof on the plate. Also, Fairmount Diazo Resin No. 4 is used and applied from a 0.8% aqueous solution.

*Example 8*

A 1% aqueous dispersion of sulfonated urea-formaldehyde is applied over a support member. While the member is still wet, it is wiped with a squeegee and then dried at 120° F. The assembly is then heated at 150° C. for 6 minutes. A second coat of monomeric acrylic acid is applied from a 4% aqueous solution and the assembly heated at 100° F. until dry. A birchromated colloidal dispersion of albumin is then applied over the second coat by roller coating, and the plate is then allowed to dry.

*Example 9*

An aluminum plate is grained by treatment with a 10% aqueous solution of trisodium phosphate and then washed and desmutted. The plate is then rinsed and treated with a 2% chromic acid solution for 4.5 minutes at 150° F. to form an oxide layer on the surface. The plate is next dipped into a 0.8% aqueous dispersion of a polyfunctional urea-formaldehyde resin, which may also contain 3% of triethylene glycol as a humectant, and then heated at 170° C. for 6 minutes. A 5% aqueous solution of methacrylic acid is roller-coated over the resin coat, and the assembly heated under an infra-red lamp until dry. An aqueous solution of bichromated casein is blade-coated over the resulting coating and then air dried.

*Example 10*

A zinc plate is treated with a 1.5% aqueous solution of a sulfonated urea-formaldehyde resin formed by reacting formaldehyde with urea in a molar ratio of 2:1, respectively, and with sodium bisulfite present in an amount of 5% by weight of the urea. The resin is prepared in accordance with Patent No. 2,559,578 and therefore is initially water-soluble. The plate is heated at 120° F. until dry and then further heated at 160° C. for 8 minutes. The sulfonated urea-formaldehyde resin deposits as a coat over the plate and becomes strongly adhered thereto. A 6% aqueous solution of sodium acrylate is next blade-coated over the resin coat, and the assembly heated under infra-red lamps at about 120° F. until dry. A bichromated gelatin colloidal dispersion is applied over the resulting hydrophilic coating in an amount to cover it and form a film of suitable thickness for lithographic reproduction techniques.

*Example 11*

A copper plate is coated with a 1.2% aqueous dispersion of a polyfunctional urea-formaldehyde resin formed by reacting formaldehyde with urea in a molar ratio of 2.3:1 to which triethanolamine is added in an amount of about 10% based on the weight of the urea. The resin is prepared in accordance with Patent No. 2,554,475 and therefore is water-dispersible. The plate is heated at 120° F. until dry and then further heated at 200° C. for 5 minutes. The modified urea-formaldehyde resin deposits as a coat over the plate and becomes strongly bonded thereto. A second coat of acrylamide is applied from a 6% aqueous solution by dipping the plate in such solution, after which the plate is heated at 140° F. until dry. A bichromated gum arabic colloidal dispersion is finally applied as an overcoat to the resulting coating, and the plate is then dried. Drying may be hastened by forcing air over the plate as by a fan.

*Example 12*

A procedure is carried out like the procedure of Example 10 except that an aluminum plate is used which has been electrolytically anodized. After application of the dispersion containing the light sensitive agent, the dispersion is reduced to a thin film by whirling the plate until dry. The plate thus prepared is ready for exposure to light.

*Example 13*

A procedure is carried out like the procedure of Example 10 except that the resin used is that prepared by Example 6 of Patent No. 2,559,578, and the light sensitive agent is a diazo compound, Fairmount Diazo Resin No. 4, manufactured by the Fairmount Chemical Company, and applied from a 1% aqueous solution. This diazo resin is a condensation product of paraformaldehyde with p-diazo-diphenylamine sulfate. After the diazo application, the entire assembly is finally heated at 110° F. until dry.

*Example 14*

A procedure is carried out like the procedure of Example 11 except that the resin used is that prepared by Example 1 of Patent No. 2,554,475 and more resin is employed to deposit a thicker coat thereof on the plate. Also Fairmount Diazo Resin No. 4 is used and applied from a 0.8% aqueous solution.

All of the foregoing plates can be exposed to light through a stencil, transparency or negative to react selected areas of the light sensitive agent and form oleophilic light-decomposition products in the usual manner. The non-reacted areas of the light sensitive agent are then removed as by a water wash, after which the plate is readied for the press in a conventional manner.

As used herein, the term "hydrophilic" means sufficiently water-attractive of water-loving to be attractive to water and/or repellent to ink for lithographic printing purposes.

Other forms embodying the features of the invention may be employed, change being made as regard the features herein disclosed, provided those stated by any of the following claims or the equivalent of such features be employed.

We therefore particularly point out and distinctly claim as our invention:

1. In a lithographic plate having a base member, an overlying layer on said base member of a light sensitive material reactive to light to define printing and non-printing areas and a hydrophilic intermediate coating between said base member and said light sensitive material, the improvement wherein said intermediate coating comprises: a first coat overlying the base member and adhered thereto and consisting essentially of a water-soluble modified resin condensation product polymerized to a water-insoluble state selected from the group consisting of a methylated methylol melamine, an ethylated methylol melamine, a polyalkylenepolyamine-melamine-formaldehyde, a sulfonated urea-formaldehyde, and a condensation product of urea, formaldehyde and an amine selected from the group consisting of alkylene polyamines, the condensation products of tetraethylene pentamine and epichlorohydrin, the condensation products of tetraethylene pentamine and formaldehyde, guanidine, biguanide and alkanolamines; and a second coat overlying the first coat and consisting essentially of a reaction product of said first coat and an acrylic compound selected from the group consisting of acrylic acid, methacrylic acid, the water-soluble salts of such acids, acrylamide and methyl acrylamide.

2. A plate as claimed in claim 1 wherein said base member is a metal selected from the group consisting of aluminum, zinc, tin, magnesium, lead, chromium, copper and iron.

3. In a lithographic plate having a base member, an overlying layer on said base member of a light sensitive material reactive to light to define printing and non-printing areas and a hydrophilic intermediate coating between said base member and said light sensitive material, the improvement wherein said intermediate coating comprises: a first coat overlying the base member and adhered thereto consisting essentially of a water-soluble modified melamine-formaldehyde resin condensation product polymerized to a water-insoluble state selected from the group consisting of a methylated methylol melamine, and an ethylated methylol melamine; and a second coat overlying the first coat and consisting essentially of a reaction product of said first coat with a monomeric acrylic compound selected from the group consisting of acrylic acid, methacrylic acid, the water-soluble salts of said acids, acrylamide and methyl acrylamide.

4. In a lithographic plate having a base member, an overlying layer on said base member of a light sensitive material reactive to light to define printing and non-printing areas and a hydrophilic intermediate coating between said base member and said light sensitive material, the improvement wherein said intermediate coating comprises: a first coat overlying the base member and adhered thereto consisting essentially of a water-soluble polyalkylenepolyamine-melamine-formaldehyde resin condensation product polymerized to a water-insoluble state; and a second coat overlying the first coat and consisting essentially of a reaction product of said first coat with a monomeric acrylic compound selected from the group consisting of acrylic acid, methacrylic acid, the water-soluble salts of said acids, acrylamide and methyl acrylamide.

5. A plate as claimed in claim 4 wherein the polyalkylenepolyamine of said resin is one selected from the group consisting of diethylenetriamine, triethylenetetramine, tetraethylenepentamine, 4,4′-iminobisbutylamine, 3,3′,3″-nitrilotrispropylamine, 3,3′-iminobispropylamine and polyethylene.

6. A plate as claimed in claim 4 wherein the polyalkylenepolyamine reacted with said resin is a water-soluble aldehyde-reactive polyalkylenepolyamine having a ratio of carbon atoms to nitrogen atoms which is not greater than about 4:1.

7. In a lithographic plate having a base member, an overlying layer on said base member of a light sensitive material reactive to light to define printing and non-printing areas and a hydrophilic intermediate coating between said base member and said light sensitive material, the improvement wherein said intermediate coating comprises: a first coat overlying said base member and adhered thereto consisting essentially of a water-soluble modified condensation product of urea, formaldehyde and an amine selected from the group consisting of alkylene polyamines, the condensation products of tetraethylene pentamine and epicholorhydrin, the condensation products of tetraethylene pentamine and formaldehyde, guanidine, biguanide, and alkanolamines, polymerized to a water-insoluble state; and a second coat overlying the first coat and consisting essentially of a reaction product of said first coat with an acrylic compound selected from the group consisting of acrylic acid, methacrylic acid, the water-soluble salts of said acids, acrylamide and methyl acrylamide.

8. In a lithographic plate having a base member, an overlying layer on said base member of a light sensitive material reactive to light to define printing and non-printing areas and a hydrophilic intermediate coating between said base member and said light sensitive material, the improvement wherein said intermediate coating comprises: a first coat overlying and adhered to said base member consisting essentially of a water-soluble modified condensation product of urea, formaldehyde and an amine selected from the group consisting of alkylene polyamines, the condensation products of tetraethylene pentamine and epicholorohydrin, the condensation products of tetraethylene pentamine and formaldehyde, guanidine, biguanide, and alkanolamines, polymerized to a water-insoluble state, said condensation product having a mol ratio of from about 2.0 to about 3.0 mols of formaldehyde per mol of urea, said amine being reacted therewith in an amount of from about 2% to about 80% based on the weight of the urea; and a relatively more hydrophilic second coat overlying the first coat and consisting essentially of a reaction product of said first coat and an acrylic compound selected from the group consisting of acrylic acid, methacrylic acid, the water-soluble salts of said acids, acrylamide and methyl acrylamide.

9. In a lithographic plate having a base member, an overlying layer on said base member of a light sensitive material reactive to light to define printing and non-printing areas and a hydrophilic intermediate coating between said base member and said light sensitive material, the improvement wherein said intermediate coating comprises: a first coat overlying and adhered to said base member consisting essentially of a water-soluble modified condensation product of urea, formaldehyde and an amine selected from the group consisting of alkylene polyamines, the condensation products of tetraethylene pentamine and epichlorohydrin, the condensation products of tetraethylene pentamine and formaldehyde, guanidine, biguanide, and alkanolamines polymerized to a water-insoluble state, said condensation product having a mol ratio of from about 2.3 to about 2.8 mols of formaldehyde per mol of urea, said amine being reacted therewith in an amount of from about 6% to about 15% based on the weight of the urea; and a relatively more hydrophilic second coat overlying the first coat and consisting essentially of a reaction product of said first coat and a monomeric acrylic compound selected from the group consisting of acrylic acid, methacrylic acid, the water-soluble salts of said acids, acrylamide and methyl acrylamide, said reaction product being formed by reaction of said condensation product with the ethylenic linkage of said acrylic compound, the acrylic portion of the reaction product providing the hydrophilic character of said intermediate coating, the balance of said reaction product being less hydrophilic and serving as a barrier between a light sensitive agent and said base member.

10. In a lithographic plate having a base member, an overlying layer on said base member of a light sensitive material reactive to light to define printing and non-printing areas and a hydrophilic intermediate coating between said base member and said light sensitive material, the improvement wherein said intermediate coating comprises: a first coat overlying said base member and adhered thereto consisting essentially of a water-soluble urea-formaldehyde resin modified with an alkali metal salt of sulfurous acid polymerized to a water-insoluble state; and a second coat overlying the first coat and consisting essentially of a reaction product of said first coat with a monomeric acrylic compound selected from the group consisting of acrylic acid, methacrylic acid, the water-soluble salts of said acids, acrylamide and methyl acrylamide.

11. In a lithographic plate having a base member, an overlying layer on said base member of a light sensitive material reactive to light to define printing and non-printing areas and a hydrophilic intermediate coating between said base member and said light sensitive material, the improvement wherein said intermediate coating comprises: a first coat overlying said base member and adhered thereto consisting essentially of a water-soluble sulfonated urea-formaldehyde resin modified with an alkali metal salt of sulfurous acid polymerized to a water-insoluble state, said resin being formed by reacting about 1.5 to 3 mols of formaldehyde for each mol of urea with an alkali metal salt of sulfurous acid present in an amount of at least about 5% of the urea; and a relatively more hydrophilic second coat overlying the first coat and consisting essentially of a reaction product of said first coat and a monomeric acid compound selected from the group consisting of acrylic acid, methacrylic acid, the water-soluble salts of said acids, acrylamide and methyl acrylamide, said reaction product being formed by reaction of said condensation product with the ethylenic linkage of the acrylic compound, the acrylic portion of the reaction product providing the hydrophilic character of said coating, the balance of said reaction product being less hydrophilic and serving as a barrier between said light sensitive agent and said base member.

12. A plate as claimed in claim 11 wherein said base member is composed of aluminum, and the alkali metal salt of sulfurous acid is selected from the class consisting of sodium bisulfite and sodium metabisulfite.

13. A plate as claimed in claim 11 wherein said base member is composed of aluminum, and the alkali metal salt of sulfurous acid is present in an amount of about 5% to 60% by weight of the urea.

14. In a lithographic plate having a base member, an overlying layer on said base member of a light sensitive material reactive to light to define printing and non-printing areas and a hydrophilic intermediate coating between said base member and said light sensitive material, the improvement wherein said intermediate coating comprises: a first coat overlying and adhered to the base member consisting essentially of a water-dispersible alkylated methylol melamine resin condensation product polymerized to a substantially water-insoluble hydrophilic state, said condensation product being formed from melamine and formaldehyde in a mixture of water and an aliphatic alcohol selected from the group consisting of a methyl alcohol and ethyl alcohol, such ingredients being initially reacted at a mol ratio of alcohol to water between about 5:1 and 0.5:1, a mol ratio of alcohol to formaldehyde between about 0.4:1 to 5:1, and a mol ratio of melamine to formaldehyde between about 1:1.5 to 1:6, after which alcohol of the group defined is added to bring the mol ratio of alcohol to water to at least about 2:1 and additional alkylation then effected; and a relatively more hydrophilic second coat overlying the first coat and consisting essentially of a reaction product of said first coat and acrylic compound, said compound being selected from the group consisting of acrylic acid, methacrylic acid, the water-soluble salts of said acids, acrylamide and methyl acrylamide.

15. In a lithographic plate having a base member, an overlying layer on said base member of a light sensitive material reactive to light to define printing and non-printing areas and a hydrophilic intermediate coating between said base member and said light sensitive material, the improvement wherein said intermediate coating comprises: a first coat overlying and adhered to the base member consisting essentially of a water-dispersible alkylated methylol melamine resin condensation product polymerized to a substantially water-insoluble hydrophilic state, said condensation product being formed from melamine and formaldehyde in a mixture of water and an aliphatic alcohol selected from the group consisting of methyl alcohol and ethyl alcohol, such ingredients being initially reacted at a mol ratio of alcohol to water between about 2:1 to 1:1, a mol ratio of alcohol to formaldehyde between about 0.5:1 to 1:1, a mol ratio of melamine to formaldehyde between about 1:2.5 to 1:4, after which alcohol of the group defined is added to bring the mol ratio of alcohol to water to at least about 2:1 and additional alkylation then effected; and a relatively more hydrophilic second coat overlying the first coat and consisting essentially of a reaction product of said first coat and an acrylic compound applied thereover in monomeric form, said monomeric acrylic compound being selected from the group consisting of acrylic acid, methacrylic acid, the water-soluble salts of said acids, acrylamide and methyl acrylamide, said reaction product being formed by reaction of said condensation product with the ethylenic linkage of said acrylic compound portion of the reaction product providing the hydrophilic character of said coating, the balance of said reaction product being less hydrophilic and serving as a barrier between said light sensitive material and said base member.

16. In a lithographic plate having a base member, an overlying layer on said base member of a light sensitive material reactive to light to define printing and non-printing areas and a hydrophilic intermediate coating between said base member and said light sensitive material, the improvement wherein said intermediate coating comprises: a first coat overlying the base member and adhered thereto and consisting essentially of a water-dispersible cationic polyalkylenepolyamine-melamine-formaldehyde resin condensation product polymerized to a substantially water-insoluble hydrophilic state, said condensation product being formed by drying beyond its gel point and containing more than five mols of combined formaldehyde per mole of melamine, the ratio of the number of nitrogen atoms in said polyalkylenepolyamine to the number of mols of said melamine being between about 0.3:1 and 10:1; and a relatively more hydrophilic second coat overlying the first coat and consisting essentially of a reaction product of said first coat and an acrylic compound, said compound being selected from the group consisting of acrylic acid, methacrylic acid, the water-soluble salts of said acids, acrylamide and methyl acrylamide.

17. In a lithographic plate having a base member, an overlying layer on said base member of a light sensitive material reactive to light to define printing and non-printing areas and a hydrophilic intermediate coating between said base member and said light sensitive material, the improvement wherein said intermediate coating comprises: a first coat overlying the base member and adhered thereto consisting essentially of a water-dispersible cationic polyalkylenepolyamine-melamine-formaldehyde resin condensation product polymerized to a substantially water-insoluble hydrophilic state, said condensation product being formed by drying beyond its gel point and containing 8 to 30 mols of combined formaldehyde per mol of melamine, the ratio of the number of nitrogen atoms in said polyalkylenepolyamine to the number of mols of said melamine being between about 0.5:1 and 4:1; and a relatively more hydrophilic second coat overlying the first coat and consisting essentially of a reaction product of said first coat with an acrylic compound applied thereover in monomeric form, said monomeric acrylic compound being selected from the group consisting of acrylic acid, methacrylic acid, the water-soluble salts of said acids, acrylamide and methyl acrylamide, said reaction produce being formed by reaction of said condensation product with the ethylenic linkage of such acrylic compound, the acrylic portion of the reaction product providing the hydrophilic character of said coating, the balance of said reaction product being less hydrophilic and serving as a barrier between said light sensitive agent and said base member.

18. In a process of preparing a lithographic plate by applying to a base member an intermediate coating and to said intermediate coating a light sensitive material reactive to light to define printing and non-printing areas, the improvement wherein the intermediate coating is formed by: coating said base member with an aqueous solution of a curable modified melamine-formaldehyde resin condensation product selected from the group consisting of a methylated methylol melamine, an ethylated methylol melamine, a polyalkylenepolyamine-melamine-formaldehyde, a sulfonated urea-formaldehyde and a condensation product of urea, formaldehyde and an amine selected from the group consisting of alkylene polyamines, the condensation products of tetraethylene pentamine and epichlorohydrin, the condensation products of tetrathylene pentamine and formaldehyde, guanidine, biguanide and alkanol amines, followed by converting such condensation product to a water-insoluble state thereby to form a coat, then applying over such coat an aqueous solution of an acrylic compound selected from the group consisting of acrylic acid, methacrylic acid, the water-soluble salts of such acids, acrylamide and methyl acrylamide, and heating to form a second coat consisting essentially of the reaction product of such condensation product and acrylic compound.

19. In a process of preparing a lithographic plate by applying to a base member an intermediate coating and to said intermediate coating a light sensitive material reactive to light to define printing and non-printing areas, the improvement wherein the intermediate coating is formed by: coating said base member with an aqueous solution of a curable modified melamine-formaldehyde resin condensation product selected from the group consisting of a methylated methylol melamine, an ethylated methylol melamine, a polyalkylenepolyamine-melamine-formaldehyde, a sulfonated urea-formaldehyde and a condensation product of urea, formaldehyde and an amine selected from the group consisting of alkylene polyamines, the condensation products of tetraethylene pentamine and epichlorohydrin, the condensation products of tetrathylene pentamine and formaldehyde, guanidine, biguanide and alkanol amines, polymerizing such condensation product to a water-insoluble coat, applying over such coat an aqueous solution of a water-soluble acrylic compound selected from the group consisting of acrylic acid, methacrylic acid, the water-soluble salts of such acids, acrylamide and methyl acrylamide, and heating to form a second coat consisting essentially of the reaction product of such condensation product and acrylic compound.

20. In a process of preparing a lithographic plate by applying to a base member an intermediate coating and to said intermediate coating a light sensitive material reactive to light to define printing and non-printing areas, the improvement wherein the intermediate coating is formed by: coating said base member with an aqueous solution of a curable alkylated methylol melamine resin condensation product selected from the group consisting of a methylated methylol melamine and an ethylated methylol melamine, heating to polymerize such condensation product to a water-insoluble coat, applying over such coat a water-soluble acrylic compound selected from the group consisting of acrylic acid, methacrylic acid, the water-soluble salts of said acids, acrylamide and methyl acrylamide, and heating to form a second coat consisting essentially of the reaction product of such condensation product and acrylic compound.

21. In a process of preparing a lithographic plate by applying to a base member an intermediate coating and to said intermediate coating a light sensitive material reactive to light to define printing and non-printing areas, the improvement wherein the intermediate coating is formed by: coating said base member with an aqueous solution of a curable polyalkylenepolyamine-melamine-formaldehyde resin condensation product, heating to polymerize such condensation product to a water-insoluble coat, applying over such coat a water-soluble acrylic compound selected from the group consisting of acrylic acids, methacrylic acid, the water-soluble salts of said acids, acrylamide and methyl acrylamide, and heating to form a second coat consisting essentially of the reaction product of such condensation product and acrylic compound.

22. In a process of preparing a lithographic plate by applying to a base member an intermediate coating and to said intermediate coating a light sensitive material reactive to light to define printing and non-printing areas, the improvement wherein the intermediate coating is formed by: coating said base member with an aqueous dispersion of a curable alkylated methylol melamine resin condensation product formed by reacting melamine and formaldehyde in a mixture of water and an aliphatic alcohol selected from the group consisting of methyl alcohol and ethyl alcohol, such ingredients being initially reacted at a mol ratio of alcohol to water between about 5:1 and 0.5:1, a mol ratio of alcohol to formaldehyde between about 0.4:1 and 5:1, and a mol ratio of melamine to formaldehyde between about 1:1.5 and 1:6, after which additional alcohol of the group defined is added to bring the mol ratio of alcohol to water to at least about 2:1 and additional alkylation then effected, heating to drive off the water and further polymerize said condensation product to deposit the condensation product as a coat over the support base, applying a solution of a monomeric acrylic compound over such deposited coat, such acrylic compound being selected from the group consisting of acrylic acid, methacrylic acid, the water-soluble salts of such acids, acrylamide and methyl acrylamide, and heating to react such acrylic compound with said coat to form a reaction product defining a second overlying coat.

23. In a process of preparing a lithographic plate by applying to a base member an intermediate coating and to said intermediate coating a light sensitive material reactive to light to define printing and non-printing areas, the improvement wherein the intermediate coating is formed by: coating said base member with an aqueous solution of a curable alkylated methylol melamine resin condensation product formed by reacting melamine and formaldehyde in a mixture of water and an aliphatic alcohol selected from the group consisting of methyl alcohol and ethyl alcohol, such ingredients being initially reacted at a mol ratio of alcohol to water between about 2:1 to 1:1, a mol ratio of alcohol to formaldehyde between about 0.5:1 to 1:1, a mol ratio of melamine to formaldehyde between about 1:2.5 to 1:4, after which additional alcohol of the group defined is added to bring the mol ratio of alcohol to water to at least about 2:1 and additional alkylation then effected, heating to drive off the water and further polymerize said condensation product to deposit the condensation product as a water-insoluble coat over said base member, applying an aqueous solution of a monomeric acrylic compound over the resin coat, such acrylic compound being selected from the group consisting of acrylic acid, methacrylic acid, the water-soluble salts of such acids, acrylamide and methyl acrylamide, and heating to react such acrylic compound with such coat through the ethylenic linkage of such compound and define a coating on such base member having an outwardly oriented acrylic portion of the resulting reaction product to provide water-attraction and an inwardly oriented less hydrophilic portion of such reaction product.

24. In a process of preparing a lithographic plate by applying to a base member an intermediate coating and to said intermediate coating a light sensitive material reactive to light to define printing and non-printing areas, the improvement wherein the intermediate coating is formed by: coating said base member with an aqueous dispersion of a curable cationic polyalkylenepolyamine-melamine-formaldehyde resin condensation product formed by reacting more than 5 mols of formaldehyde with each mol of melamine and with a sufficient amount of polyalkylenepolyamine to provide about 0.3 to 10 atoms of nitrogen to each mol of melamine, heating to drive off the water and further polymerize said condensation product to deposit the condensation product as a coat over said base member, applying a solution of a monomeric acrylic compound over such deposited resin coat, such acrylic compound being selected from the group consisting of acrylic acid, methacrylic acid, the water-soluble salts of such acids, acrylamide and methyl acrylamide, and heating to react such acrylic compound with said coat to form a reaction product defining a second overlying coat.

25. In a process of preparing a lithographic plate by applying to a base member an intermediate coating and to said intermediate coating a light sensitive material reactive to light to define printing and non-printing areas, the improvement wherein the intermediate coating is formed by: coating said base member with an aqueous solution of a curable cationic polyalkylenepolyamine-melamine-formaldehyde condensation product formed by reacting 8 to 30 mols of formaldehyde with each mol of melamine and with a sufficient amount of a polyalkylene-polyamine to provide about 0.5 to 4 atoms of nitrogen to each mol of melamine, heating to drive off the water and further polymerize said condensation product to deposit the condensation product as a water-insoluble coat over the base member, applying an aqueous solution of a monomeric acrylic compound over the resin coat, such acrylic compound being selected from the group consisting of acrylic acid, methacrylic acid, the water-soluble salts of such acids, acrylamide and methyl acrylamide, and heating to react such acrylic compound with such coat through the ethylenic linkage of such compound and define a coating on said base member having an outwardly oriented acrylic portion of the resulting reaction product to provide water-attraction and an inwardly oriented less hydrophilic portion of such reaction product to serve as a barrier to said base member.

26. In a process of preparing a lithographic plate by applying to a base member an intermediate coating and to said intermediate coating a light sensitive material reactive to light to define printing and non-printing areas, the improvement wherein the intermediate coating is formed by: coating said base member with an aqueous solution of a curable modified urea-formaldehyde resin condensation product selected from the group consisting of a sulfonated urea-formaldehyde and a condensation product of urea, formaldehyde and an amine selected from the group consisting of alkylene polyamines, the condensation products of tetraethylene pentamine and epichlorohydrin, the condensation products of tetraethylene pentamine and formaldehyde, guanidine, biguanide and alkanol amines, converting such resin to a water-insoluble state thereby to apply a coat to such member, applying over such coat an aqueous solution of an acrylic compound selected from the group consisting of acrylic acid, methacrylic acid, the water-soluble salts of such acids, acrylamide and methyl acrylamide, and heating to form a second coat consisting essentially of a reaction product of such condensation product and acrylic compound.

27. In a process of preparing a lithographic plate by applying to a base member an intermediate coating and to said intermediate coating a light sensitive material reactive to light to define printing and non-printing areas, the improvement wherein the intermediate coating is formed by: coating said base member with an aqueous solution of a curable modified condensation product of urea, formaldehyde and an amine selected from the group consisting of alkylene polyamines, the condensation products of tetraethylene pentamine and epichlorohydrin, the condensation products of tetraethylene pentamine and formaldehyde, guanidine, biguanide, and alkanol amines, heating to polymerize such condensation product to a water-insoluble state and thereby insolubilize the condensation product as a water-insoluble coat over said base member, applying over such coat a water-soluble acrylic compound selected from the group consisting of acrylic acid, methacrylic acid, the water-soluble salts of said acids, acrylamide and methyl acrylamide, and heating to form a second coat consisting essentially of the reaction product of such condensation product and acrylic compound.

28. In a process of preparing a lithographic plate by applying to a base member an intermediate coating and to said intermediate coating a light sensitive material reactive to light to define printing and non-printing areas, the improvement wherein the intermediate coating is formed by: coating said base member with an aqueous solution of a curable condensation product of urea, formaldehyde and an amine selected from the group consisting of alkylene polyamines, the condensation products of tetraethylene pentamine and epichlorohydrin, the condensation products of tetraethylene pentamine and formaldehyde, guanidine, biguanide and alkanol amines, said condensation product being formed from a mol ratio of from about 2 to about 3 mols of formaldehyde per mol of urea, said amine being reacted therewith in an amount from about 2% to about 80% based on the weight of the urea, heating to deposit said condensation product as a coat over said base member, applying a solution of a monomeric acrylic compound over such deposited coat selected from the group consisting of acrylic acid, methacrylic acid, the water-soluble salts of said acids, acrylamide and methyl acrylamide, and heating to react such acrylic compound with said coat to form a reaction product defining a second overlying coat.

29. In a process of preparing a lithographic plate by applying to a base member an intermediate coating and to said intermediate coating a light sensitive material reactive to light to define printing and non-printing areas, the improvement wherein the intermediate coating is formed by: coating said base member with an aqueous solution of a curable condensation product of urea, formaldehyde and an amine selected from the group consisting of alkylene polyamines, the condensation products of tetraethylene pentamine and epichlorohydrin, the condensation products of tetraethylene pentamine and formaldehyde, guanidine, biguanide and alkanol amines, said condensation product being formed from a mol ratio of from about 2.3 to about 2.8 mols of formaldehyde per mol of urea, said amine being reacted therewith in an amount from about 6% to about 15% based on the weight of the urea, heating to drive off the water and further polymerize said condensation product to deposit a water-insoluble coat on said base member, applying an aqueous solution of a monomeric acrylic compound over such coat selected from the group consisting of acrylic acid, methacrylic acid, the water-soluble salts of said acids, acrylamide and methyl acrylamide, and heating to react such acrylic compound with such coat through the ethylenic linkage of such acrylic compound and define a coating on said base member having an outwardly oriented acrylic portion of the resulting reaction product to provide water-attraction and an inwardly oriented less hydrophilic portion of such reaction product to serve as a barrier.

30. In a process of preparing a lithographic plate by applying to a base member an intermediate coating and to said intermediate coating a light sensitive material reactive to light to define printing and non-printing areas, the improvement wherein the intermediate coating is formed by: coating said base member with an aqueous solution of a curable sulfonated urea-formaldehyde resin formed by reacting about 1.8 to 3 mols of formaldehyde for each mol of urea with an alkali metal salt of sulfurous acid present in an amount of at least about 5% by weight of the urea, heating at a temperature sufficient to drive off the water and further polymerize said resin to deposit the resin as a coat over said base member, applying an aqueous solution of a monomeric acrylic compound over such deposited resin coat, such acrylic compound being selected from the group consisting of acrylic acid, methacrylic acid, the water-soluble salts of such acids, acrylamide, and methyl acrylamide, and heating to react such acrylic compound with such resin coat to form a second overlying coat consisting essentially of the reaction product of the resin coat and the acrylic compound, said coats together defining a coating on said base member having an outwardly oriented acrylic portion of the resulting reaction product to provide water-attraction and an inwardly oriented less hydrophilic portion of such reaction product to serve as a barrier.

31. A process as claimed in claim 30 wherein said base member is metallic and the alkali metal salt of sulfurous acid is selected from the group consisting of sodium bisulfite and sodium metabisulfite, and further including the step of oxidizing the metallic base prior to applying such coats.

32. A process as claimed in claim 30 wherein said base member is metallic and the alkali metal salt of sulfurous acid is present in an amount of about 5% to 60% by weight of the urea, and further including the step of oxidizing the metallic base prior to applying such coats.

33. In a process of preparing a lithographic plate by applying to a base member an intermediate coating and to said intermediate coating a light sensitive material reactive to light to define printing and non-printing areas, the improvement wherein the intermediate coating is formed by: coating said base member with an aqueous solution of a curable sulfonated urea-formaldehyde resin, heating to polymerize such resin to a water-insoluble state and thereby insolubilize the resin as a water-insoluble coat over said base member, applying over such coat a water-soluble acrylic compound selected from the group consisting of acrylic acid, methacrylic acid, the water-soluble salts of said acids, acrylamide and methyl acrylamide, and heating to form a second coat consisting essentially of the reaction product of such first coat and acrylic compound.

34. In a process of preparing a lithographic plate by applying to a base member an intermediate coating and to said intermediate coating a light sensitive material reactive to light to define printing and non-printing areas, the improvement wherein the intermediate coating is formed by: coating said base member with an aqueous solution of a water-soluble curable modified urea-formaldehyde resin condensation product selected from the group consisting of a sulfonated urea-formaldehyde and a condensation product of urea, formaldehyde and an amine selected from the group consisting of alkylene polyamines, the condensation products of tetraethylene pentamine and epichlorohydrin, the condensation products of tetraethylene pentamine and formaldehyde, guanidine, biguanide and alkanol amines, converting such condensation product to a water-insoluble state thereby to apply a hydrophilic coat to said base member, applying over such coat a water-soluble acrylic compound selected from the group consisting of acrylic acid, methacrylic acid, the water-soluble salts of said acids, acrylamide and methyl acrylamide, and heating to form a second coat consisting essentially of the reaction product of such condensation product and acrylic compound.

References Cited by the Examiner

UNITED STATES PATENTS

| | | | |
|---|---|---|---|
| 2,534,650 | 12/1950 | Worthen | 96—33 |
| 2,760,431 | 8/1956 | Beatty | 96—33 |
| 3,083,118 | 3/1963 | Bridgeford | 96—115 |
| 3,136,639 | 6/1964 | Deal et al. | 96—33 |

NORMAN G. TORCHIN, *Primary Examiner.*

C. E. VAN HORN, *Assistant Examiners.*